United States Patent [19]

Irle et al.

[11] Patent Number: 6,166,535
[45] Date of Patent: Dec. 26, 2000

[54] INDUCTIVE ANGLE SENSOR THAT ADAPTS AN OSCILLATOR FREQUENCY AND PHASE RELATIONSHIP TO THAT OF AN INTERFERENCE FREQUENCY

[75] Inventors: Henning Irle, Lippstadt; Norbert Kost, Geseke; Franz-Josef Schmidt, Salzkotten, all of Germany

[73] Assignee: Hella KG Hueck & Co., Lippstadt, Germany

[21] Appl. No.: 09/148,706

[22] Filed: Sep. 4, 1998

[30] Foreign Application Priority Data

Sep. 5, 1997 [DE] Germany .......................... 197 38 834

[51] Int. Cl.[7] ............................................. G01B 7/30
[52] U.S. Cl. .................. 324/207.25; 324/207.17; 324/207.12
[58] Field of Search ................... 324/207.15, 207.16, 324/207.17, 207.18, 207.22, 207.23, 207.25, 207.12; 331/117 R

[56] References Cited

U.S. PATENT DOCUMENTS

| | | | |
|---|---|---|---|
| 4,940,950 | 7/1990 | Helfrick | 331/2 |
| 5,317,284 | 5/1994 | Yang | 331/2 |
| 5,406,155 | 4/1995 | Persson | 310/68 B |
| 6,011,389 | 1/2000 | Masreliez et al. | 324/207.17 |

FOREIGN PATENT DOCUMENTS

| | | |
|---|---|---|
| 0 159 191 | 10/1985 | European Pat. Off. . |
| 39 03 278 C2 | 8/1990 | Germany . |
| 39 19 916 C2 | 12/1990 | Germany . |
| 41 20 806 C2 | 1/1993 | Germany . |

*Primary Examiner*—Christine K. Oda
*Assistant Examiner*—Henry S. Andersen
*Attorney, Agent, or Firm*—Birch, Stewart, Kolasch & Birch, LLP

[57] ABSTRACT

An inductive angle sensor for a motor vehicle has an oscillator circuit that generates a periodic AC oscillator-frequency signal in an exciting coil, at least one receiving coil, an evaluation circuit for detecting the signal induced in the at least one receiving coil, and a movable inductive coupling element that influences a strength of inductive coupling between the exciting coil and the at least one receiving coil. The oscillator circuit is a "soft" or "flexible" oscillator circuit such that when an interference frequency close to the oscillator frequency is coupled into the coil system, the oscillator circuit adapts the oscillator frequency and phase relationship to that of the interference frequency. Undesired overlapping effects are thus efficaciously prevented.

4 Claims, 1 Drawing Sheet

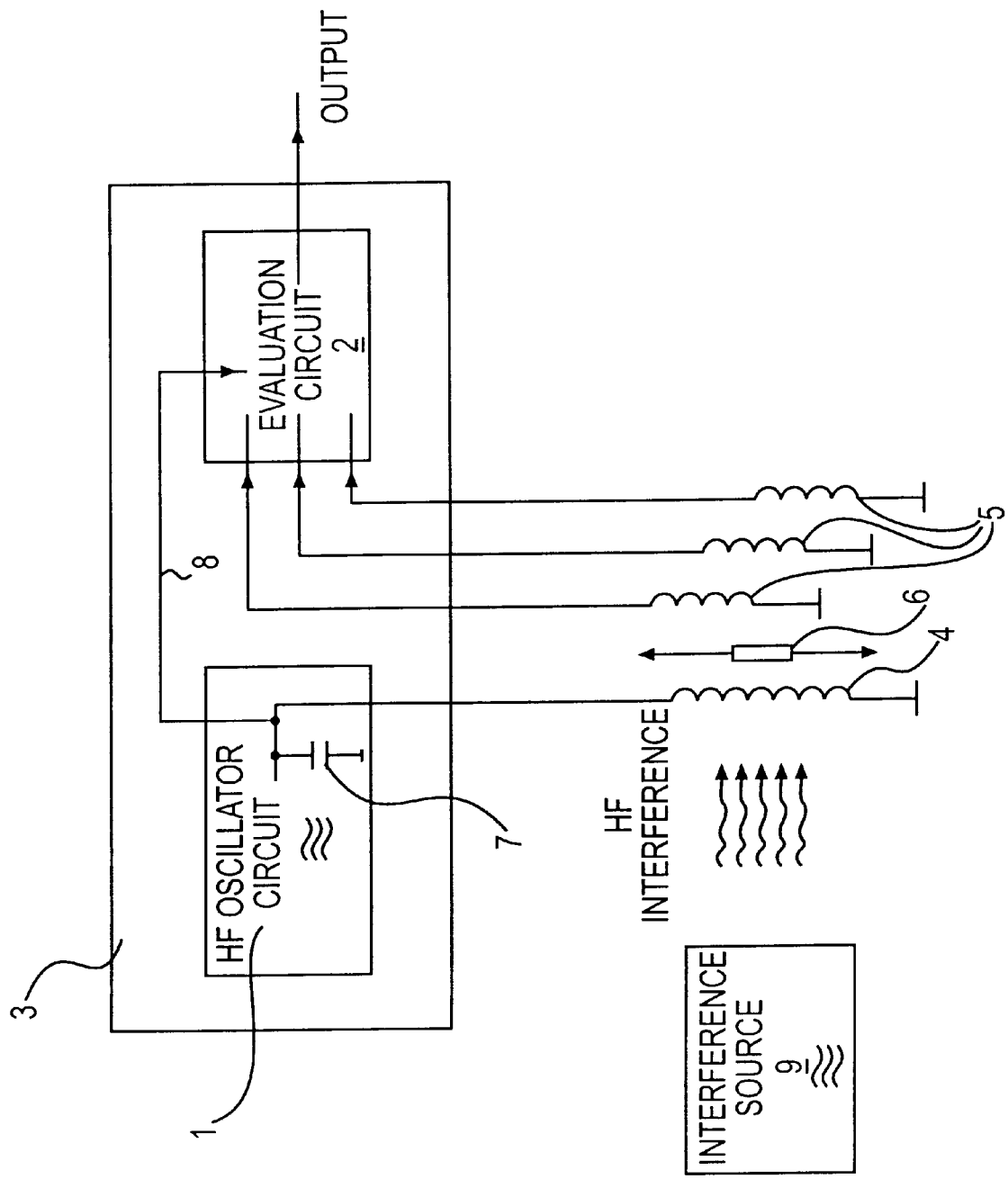

INDUCTIVE ANGLE SENSOR THAT ADAPTS AN OSCILLATOR FREQUENCY AND PHASE RELATIONSHIP TO THAT OF AN INTERFERENCE FREQUENCY

BACKGROUND OF THE INVENTION

This invention relates to an inductive angle sensor for a motor vehicle having an oscillator circuit that generates a periodic AC signal in an exciting coil, and having at least one receiving coil and an evaluation circuit for detecting a signal induced in the receiving coil, or coils, and a movable inductive coupling element that influences a strength of inductive coupling between the exciting coil and the receiving coil(s).

European patent application (0 159 191 A2), for example, discloses such an angle sensor in an embodiment of an inductive position sensor shown in FIG. 3 thereof. Inductive position sensors, particularly angle sensors, are being used increasingly, particularly in motor vehicles for replacing resistance sensors (potentiometers) which are still widely used today, because, among their other advantages, they operate without contact and are thus practically wear-free and they can also be structured so that they are largely insensitive to interferences caused by soiling or dirt contamination.

A general functioning principle of inductive position sensors is based on an AC signal being applied to an exciting coil which, in turn, induces AC signals in one, or preferably in a plurality of, receiving coils. An inductive coupling between the exciting and receiving coil(s) depends on positions of two elements of the sensor that move relative to each other; specifically on either the relative positions of exciting and receiving coils that move relative to each other or on a position of an inductive coupling element (structured as a metallic or magnetic object or a short circuit line) that moves relative to the exciting and receiving coils, with the inductive coupling changing as these positions change.

To determine a position or an angle of rotation, an evaluation circuit is used that detects amplitude values and/or phase relationships of receiving coil signals.

One particular problem with inductive sensors, especially those used in motor vehicles, is that they are sensitive to electrical, magnetic, and electromagnetic fields, which can falsify signals picked up by the receiving coil(s).

This is especially a problem in motor vehicle applications, because in this setting a number of interference sources can be present in a very narrow space and, additionally, depending on an application, an operational reliability of a sensor is certainly safety related, such as when the inductive sensor monitors an angular position of an accelerator pedal or of a throttle valve.

Electromagnetic interference can be controlled as a rule by suitable filtering (e. g. by a bandpass filter). However, this is difficult if an interference frequency is close to an operating frequency of the oscillator and an appropriately steep filter necessary to filter out these interference frequencies cannot be realized because of technological or expense reasons. In this case, an overlapping of the oscillator frequency and the interference frequency occurs, which leads to undesired effects, particularly to beating, which makes it difficult or even impossible to analyze the receiving coil signals.

Therefore, it is an object of this invention to provide a cost effective and uncomplicated inductive angle sensor that is substantially insensitive to electrical, magnetic, or electromagnetic alternating fields having interference frequencies close to an operating frequency of an oscillator.

SUMMARY OF THE INVENTION

According to principles of this invention an oscillator circuit of an inductive angle sensor is structured as an LC oscillating circuit that shifts its oscillation frequency, under influence of a coupled-in electrical, magnetic, or electromagnetic alternating field whose interference frequency lies in a preset range close to an uninfluenced base frequency of the oscillator, in a direction of the received interference frequency, and a Q-factor of the oscillator circuit is so low that the oscillator circuit operates stably with its oscillation frequency shifted from its base frequency by the externally coupled-in alternating field within a range of at least ±1 kHz.

BRIEF DESCRIPTION OF THE DRAWING

The invention is described and explained in more detail below using an embodiment shown in the drawing. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawing. The drawing is not necessarily to scale, emphasis instead being placed upon illustrating principles of the invention in a clear manner.

The accompanying drawing is a schematic diagram of an inductive angle sensor of this invention and an interference source.

DESCRIPTION OF THE PREFERRED EMBODIMENT

An inductive angle sensor has an exciting coil 4 and three receiving coils 5 that are offset from one another. In one embodiment of the angle sensor, the coils 4, 5, shown here in linear fashion, are placed along a circumference of a circle or segment of a circle, e. g. by wound strip conductors on a printed circuit board.

An integrated circuit 3 contains an oscillator circuit 1 and an analyzing, or evaluation, circuit 2. The oscillator circuit 1 is part of an LC oscillating circuit whose capacitance 7 is a condenser in the integrated circuit 3 and whose inductance is the exciting coil 4.

Signal lines of the receiving coils 5 are fed to the evaluation circuit 2, which, from amplitudes and phase relationships of receiving coil signals, calculates positions of an inductive coupling element 6 that is movable relative to the coil arrangement for creating position-dependent strength-varying couplings between the exciting coil 4 and the receiving coils 5.

The evaluation circuit 2 calculates its output signal in dependence on an oscillation frequency (HF oscillator) of the oscillator circuit 1, which is fed to it via a connecting line 8.

A problem with which the invention is concerned occurs when an interference source 9 couples an interference frequency (HF interference), which lies close to the oscillation frequency (HF oscillator) of the oscillator circuit 1, into the coil system 4, 5.

Because the oscillator frequency (HF oscillator) and the interference frequency (HF interference) overlap, or overlay one another, low-frequency beating can occur that makes it difficult or even impossible for the evaluation circuit 2 to analyze the receiving coil signals.

In the oscillator circuit 1 of the angle sensor, according to this invention, the interference frequency (HF interference) coupled into the exciting coil 4 "pulls" the oscillator frequency in the direction of the interference frequency so that, if there is not too great a difference between the (undisturbed) oscillator frequency and the interference frequency (HF interference), the oscillator circuit ultimately oscillates precisely with the frequency and phase relationship of the interference frequency (HF oscillator=HF interference).

Undesired overlapping effects (beating) are thus effectively prevented. A "pull-in range" of the oscillator circuit is at least one kilohertz and can be set with a dissipative portion of the LC oscillating circuit.

The concept of the invention is based on the oscillator circuit of the inductive sensor synchronizing the operating frequency and the interference frequency with each other, so that the interference frequency and the operating frequency are identical and in phase. This can be achieved with a so-called "flexible", or "soft", oscillator that reacts to the coupled-in interference and shifts the operating frequency to the interference frequency. In this way, undesired effects of electromagnetic coupling are prevented.

To this end, it is advantageous that the oscillator circuit forms an uncomplicated LC oscillating circuit without a particular frequency-stabilizing measure. Frequency-stabilized oscillators, particularly quartz oscillators, are too "rigid" to be synchronized to an interference frequency close to an undisturbed base frequency of the oscillator, and therefore would not be suitable to achieve the object of the invention. Furthermore, it is advantageous that an oscillator circuit forming an uncomplicated LC oscillating circuit is also particularly inexpensive to produce.

Especially since interference frequencies close to the operating frequency of the oscillator circuit are particularly difficult to filter out, and low-frequency beating effects make detection of signals supplied by the receiving coils difficult, it is advantageous for the oscillator circuit to operate in a "pull-in range" (that is, the range in which the undisturbed base frequency of the oscillator circuit can be changed without putting holes, or gaps, in its oscillations or becoming unstable) in the order of a few kilohertz (given a base frequency in the order of MHZ), with the predetermined "pull-in" range not being less than 1 kHz.

It is further advantageous if the exciting coil also forms the inductance of the LC oscillating circuit. Through the interference frequency that is coupled into the exciting coil the oscillator circuit is advantageously influenced to adjust to the interfering frequency.

It is also advantageous to feed the "actual" oscillation frequency of the oscillator circuit, i. e. the oscillation frequency that may be shifted through external influences, to the evaluation circuit as a reference frequency, with respect to which the evaluation circuit detects the signals from the receiving coils with regard to amplitude and phase relationship.

It is particularly advantageous in this regard if both the oscillator circuit (with the exception of an exciting coil belonging to the oscillating circuit) and the evaluation circuit are combined into one integrated circuit.

The invention claimed is:

1. An inductive angle sensor for a motor vehicle, having an oscillator circuit that creates a periodic AC signal in an exciting coil, and having at least one receiving coil, an evaluation circuit for detecting a signal induced in the at least one receiving coil and a movable inductive coupling element that influences a strength of inductive coupling between the exciting coil and the at least one receiving coil wherein the oscillator circuit is structured as an LC oscillating circuit that shifts its oscillation frequency under influence of a coupled-in, alternating interference field, whose interference frequency lies in a predetermined range close to an uninfluenced base frequency of the oscillating circuit, in a direction of the interference frequency, and wherein a Q-factor of the oscillating circuit is so low that the oscillating circuit operates stably with its oscillation frequency shifted from its base frequency by an externally coupled-in alternating field within a range of at least ±1 kHz.

2. An inductive angle sensor as in claim 1, wherein the exciting coil is also an inductance of the LC oscillating circuit of the oscillator circuit.

3. An inductive angle sensor as in claim 1, wherein the oscillator circuit feeds to the evaluation circuit the oscillation frequency shifted by the externally coupled-in alternating interference field as a reference frequency.

4. An inductive angle sensor as in claim 2, wherein the oscillator circuit and the evaluation circuit other than the exciting coil are combined into one integrated circuit.

* * * * *